(12) United States Patent
Ungerholm

(10) Patent No.: US 11,681,792 B2
(45) Date of Patent: Jun. 20, 2023

(54) DIGITAL, PERSONAL AND SECURE ELECTRONIC ACCESS PERMISSION

(71) Applicant: Codiqo AB, Saltsjö-Boo (SE)

(72) Inventor: Mikael Ungerholm, Saltsjö-Boo (SE)

(73) Assignee: Codiqo AB, Saltsjö-Boo (SE)

(*) Notice: Subject to any disclaimer, the term of this patent is extended or adjusted under 35 U.S.C. 154(b) by 0 days.

(21) Appl. No.: 17/755,936

(22) PCT Filed: Dec. 1, 2020

(86) PCT No.: PCT/SE2020/051153
§ 371 (c)(1),
(2) Date: May 12, 2022

(87) PCT Pub. No.: WO2021/112746
PCT Pub. Date: Jun. 10, 2021

(65) Prior Publication Data
US 2022/0382854 A1    Dec. 1, 2022

(30) Foreign Application Priority Data
Dec. 6, 2019  (SE) ................................. 1930393-2

(51) Int. Cl.
*G06F 21/00* (2013.01)
*G06F 21/46* (2013.01)
*G06F 21/50* (2013.01)

(52) U.S. Cl.
CPC .............. *G06F 21/46* (2013.01); *G06F 21/50* (2013.01); *G06F 2221/03* (2013.01)

(58) Field of Classification Search
CPC ........... G06Q 20/3274; G06Q 20/4014; G06Q 30/06; G06Q 10/02; G06F 2221/2117; G06F 2221/2137; G06F 21/35; G06F 21/604; G06F 21/6218; G06F 21/31; H04L 9/3213; H04L 63/08; H04L 63/10; H04W 12/06; H04W 12/08; G07B 15/00; G07C 9/21
See application file for complete search history.

(56) References Cited

U.S. PATENT DOCUMENTS

| 7,093,130 B1* | 8/2006 | Kobayashi .............. H04L 63/12 713/168 |
| 10,366,373 B1 | 7/2019 | Denker et al. |
| 2008/0189147 A1* | 8/2008 | Bartlett .................. G06Q 30/06 705/6 |
| 2013/0238372 A1 | 9/2013 | Jordan |
| 2015/0006208 A1* | 1/2015 | Nestor .................. G06F 21/608 705/5 |
| 2016/0350547 A1 | 12/2016 | Loughlin-McHugh et al. |
| 2017/0200151 A1 | 7/2017 | Bruno |
| 2018/0173906 A1 | 6/2018 | Rodriguez et al. |
| 2018/0359260 A1 | 12/2018 | Oberg et al. |
| 2019/0066063 A1 | 2/2019 | Jessamine |

FOREIGN PATENT DOCUMENTS

| EP | 3442249 B1 | 5/2019 |
| TW | I660308 B | 9/2018 |
| TW | 202011273 A | 3/2020 |
| WO | 2014187979 A1 | 11/2014 |
| WO | PCTSE2020051153 | 12/2020 |

OTHER PUBLICATIONS

Swedish Intellectual Property Office, International Search Report, dated May 6, 2021.
Swedish Intellectual Property Office, Stockholm, Sweden, Annex to IPRP, dated Oct. 6, 2021.
Swedish Intellectual Property Office, Stockholm, Sweden, International Preliminary Reporton Patentability (IPRP), dated Oct. 6, 2021.
Extended European search report, European Patent Office, Munich, Germany, dated Nov. 15, 2022.

* cited by examiner

*Primary Examiner* — Brandon Hoffman
*Assistant Examiner* — William A Corum, Jr.
(74) *Attorney, Agent, or Firm* — Noréns Patentbyrå AB

(57) ABSTRACT

The present invention puts forward a personal electronic access permission (Figure B, 31) that can both check on the customer's identity (Figure A, step 2) and right to access an event/venue in one scanning event, and address the unwanted secondary market, still enabling a customer (Figure D, 5) to sell back an electronic access permission to the system (Figure D, I) in case the customer is not able to attend the event.

14 Claims, 3 Drawing Sheets

DIGITAL, PERSONAL AND SECURE ELECTRONIC ACCESS PERMISSION

The invention relates to a method for generating a personal electronic access permission addressing the unwanted secondary market and ensuring an efficient entrance process validating both a customer's identity and customer's permission to access the event or venue in one scanning event

BACKGROUND

Today's ticketing business consists of a primary market and a secondary market. On the primary market the original tickets are offered to the buyers (fans) to a face value, which is defined by the promotor/artist and ticket company. Sometimes the tickets are re-sold on the secondary market, often for a much higher price than the face value.

On one hand, the secondary market is beneficial to the ecosystem of the ticketing business; the market presents an opportunity for a ticket to be resold in case the original ticket owner is unable to attend the event. As a result, there might be a higher number of attendances at the event and the chances of a successful event increase.

On the other hand, the secondary market entails tickets being sold for profit which is unwanted by most stakeholders in the ecosystem of the ticketing business. In addition to the unwanted secondary market counterfeit tickets exist, which makes the situation even worse for the customers who want to buy a ticket and trust that the ticket can give the rights to access the event in the scanning process. Since there is no secure solution that can separate an authentic ticket from a false one, the counterfeit ticket business prevails.

As the unwanted 'sell for profit' secondary market is lucrative, there are many different players, individuals as well as companies trying to make money on the secondary market. Bots are used to buy tickets when they are released on the primary market and these tickets can then be resold on the secondary market for a profit.

The ways countries regulate the secondary market differs a lot. In Sweden for example the secondary market activities are legal.

Anyone, and also bots, can use several emails, several apple IDs and several phone numbers etc. to login to buy tickets on the primary market and to re-sell the tickets for a profit on the secondary market. Some bots are optimized to get the best tickets and are very fast, which makes it difficult for buyers (fans) to compete with them. Hackers, using bots, could use stolen credit cards, email, passwords etc. to get hold of the primary tickets. Thus, to create a personal ticket the identity of the customer needs to be checked.

Some events require personal tickets for security reasons, where your name is written on the ticket (personal ticket) and the ID (for example driving license and passport) is checked at the entrance. However, to have to show your ticket and the ID is a slow process and is therefore not considered as an efficient solution. If no identification control is made nobody knows who is visiting the event, which could be crucial, for example, in case of a fire or a terrorist attack.

To know who has got a ticket to an event and who is attending an event also solves a marketing problem as you today only know who bought the digital tickets (one person can buy several tickets to some friends), not who the tickets were for and who is actually attending the event, which is a strength from a marketing point of view.

Today's scanning process, when personal tickets are used can be described with following steps:

1. scanning of an access permission (for example a ticket) and
2. in a separate step showing an approved physical ID, such as driving license or passport which is a time consuming and seen as an inefficient process.

There is a clear trend on the market that mobile tickets are preferred over paper or pdf tickets (e-tickets). In many cases a mobile ticket can easily be transferred to another person through a wallet (e.g. Apple wallet) in a mobile phone, which can be used on the unwanted 'sell for profit' secondary market. It is quite easy to take a screenshot of the ticket and pass on the ticket as a picture to another person. In some solutions the mobile device is paired with the ticket, however the mobile device can be stolen or borrowed by another user who can use the ticket with the borrowed or stolen phone. When purchasing a ticket on internet email address, name, mobile phone numbers, passwords and credit cards are normally used as authentication credentials to create an account and to identify the ticket owner. As one person can own email addresses, mobile phone numbers, mobile devices and credit cards anonymously this is not a good solution to identify a person at the entrance to the event or venue, especially since these identifying methods can be stolen as well. You could also be anonymous using for example several email addresses and mobile phone numbers. With biometrics solutions, such as Touch ID and Face ID, several users can share and have access to the same device, which makes it difficult to know who of the registered Touch ID, or Face ID, users is holding the mobile device at the scanning event and thereby difficult to identify the person entering the event. If there is no check with, for example, an external electronic ID service (like BankID in Sweden), which actually returns the user's full name and personal number to the system, there is no possibility to validate the user's real identity at a digital registration nor in the scanning process of a digital ticket. With the possibility to create an account with a fake identity and having the possibility that several persons can access the mobile device, which is paired with the ticket, there are still many opportunities to enable an unwanted 'resell for profit' secondary market and there is still no possibility to validate if the person holding the mobile device is the real owner of the ticket and therefore should have permission to access the event or has the right to sell the ticket stored in the mobile device.

Today, there is no secure digital solution which can, in one and the same solution:
- prevent the unwanted 'resell for profit' secondary market in a digital solution
- address the counterfeit market
- enable the wanted secondary market (sell the ticket in case of original owner can't attend) still preventing that reselling a ticket for profit outside the solution is possible, and
- digitally validate the identity of the owner of a personal and digital ticket and that the owner has the permission to access the event and/or the venue in one scanning event and thereby offer a fast and secure entrance process and improve the efficiency of marketing and sales campaigns before and after the event.

There are some solutions on the market that are partly addressing the problems described (for example Ticketmaster's verified fan and verified tickets, Motion QR code by Cellum group, DICE's app solution with a closed member's club and Blink Identity's biometric solution). The patent EP3442249 suggests a method for a server to control the tickets in an app wallet. The customer uses a password or authentication data to identify himself and purchase a ticket. The ticket and mobile device are then paired. A ticket owner can then transfer the ticket to a known authorized new customer, which unfortunately makes it possible to transfer money from the owner to the new authorized customer outside the system. As the ticket is paired with the mobile device it means that the ticket, itself, is not personal and a passport and driving license is needed to enter the event or venue where validation of the identity is needed. Further a scanning process is not described, so it is possible that a non-authorized user can borrow the mobile device as the ticket is paired with a mobile device and not a person.

Prior art suggests no single digital solution for all the problems described above, which is why the unwanted secondary market still prevails and that few events use personal tickets since the process checking the identity manually with driving license or passport is too cumbersome.

SUMMARY OF THE INVENTION

The present invention solves at least one of the problems discussed above to some extent by the method initially mentioned and that comprises the steps of
  a downloading an application to a mobile communication device (FIG. 4, 2)
  b registering a customer (FIG. 4, 5) on a system, comprising of server(s), database(s) and application(s) (FIG. 4, 1), by verifying the customer's identity, using an electronic ID service that is accepted for identification by government authorities and transmitting the customer's identity data (FIG. 1 10) from the electronic ID service to the system,
  c storing the customer's identity data in the system and pairing the customer's identity data (FIG. 1, 10) with a unique ID number (FIG. 1, 11),
  d storing the unique ID number (FIG. 1, 11) in the system
  e transmitting and storing the unique ID number (FIG. 1, 11) in the mobile communication device after which the customer is
  f purchasing an electronic access permission to an event through an interaction between the system and the customer, whereby
  g the system is storing and pairing a unique customer/event number (FIG. 1, 12) with the unique ID number (FIG. 1, 11) and
  h transmitting the unique customer/event number (FIG. 1, 12) to the mobile communication device;
  i generating an electronic access permission (FIG. 2, 31) by creating a value, which is varying over time, representing an electronic access permission, in the mobile communication device, by first, successfully authenticate the customer's identity with an electronic ID service (FIG. 1, step 9) and using an algorithm (FIG. 2, 30), combining, at least, the unique ID number (FIG. 1, 11) paired with the customer's identity data (FIG. 1, 10) and the unique customer/event number (FIG. 1, 12), where the electronic access permission is accessible for a predefined period of time in the mobile communication device, requiring the customer to generate a valid electronic access permission just before the scanning process at the event and
  j transmitting the generated electronic access permission to the system
  k storing the generated electronic access permission in the system
  l scanning of the generated electronic access permission in the mobile communication device with a scanning device (FIG. 4, 4);
  m comparing the scanned electronic access permission generated in the mobile communication device with the electronic access permission stored in the system
  n checking on transactions on the electronic access permission registered and hereby
  o validating both the customer's identity data (FIG. 1, 10) and the customer's permission to access the event or venue in one scanning event and
  p registering the scanning transaction on the electronic access permission in the system
addressing the unwanted secondary market and the electronic access permission counterfeits on the market. Thereby the present invention also ensures an efficient entrance process validating both the customer's identity and customer's permission to access an event or venue in one scanning event.

Preferably, step i is accomplished by creating a series of, minimum two, unique numbers separated in time representing the electronic access permission or by creating a value, which is varying over time, representing an electronic access permission, preferably, the predefined period of time when the electronic access permission is accessible in the mobile communication device can be in the range of 1 s to 72 h, depending on the security level the promoter chooses to set and the lower limit can be any one of 1 s, 10 s, 20 s, 30 s, 40 s, 50 s, 60 s, 2 min, 10 min, 30 min and the maximum limit can be any one of 72 h, 24 h, 2 h, 30 min, 10 min, 1 min, 30 s, 10 s, preferably the electronic access permission is generated, upon request, just before the scanning process at the event preferably, comprising selling back an electronic access permission to the system through an interaction between the system and the customer, whereby the electronic access permission is marked as invalid in the system and a new unique electronic access permission can be issued, preferably, validating the customer's right to sell back the electronic access permission by confirming the identity of the customer using an electronic ID service that is accepted for identification by government authorities and verifying, in the system, that the customer is the rightful owner of the electronic access permission by checking the data stored for the customer in the mobile communication device and in the system, preferably, step i is accomplished by using an algorithm which is stored in the mobile communication device, preferably, encryption of all transmitted and stored data including numbers and algorithms, preferably, checking the integrity of the stored data, numbers and algorithms, in the mobile communication device and in the system, and if the integrity of the checked data is lost, the electronic access permission becomes invalid, preferably, upon request, the making an electronic access permission invalid in the system, preferably, step o is accomplished by validating, at least the customer's name, age and customer's right to enter the event or the venue, preferably, tracking, authorizing and storing all transactions on the electronic access permission in the system, preferably, comprising controlling, by the system, how many electronic access permissions a customer can purchase, preferably, step 1 is accomplished by authenticating the individuals that can use the scanning device, the authentication of an individual is done through an electronic ID service, and if the electronic ID service is transmitting the same identity of an individual as being stored on a list of granted individuals in the system, the individual using the electronic ID service for authentication is granted access to the scanning application, preferably, validating the customer's identity by comparing the data received from the electronic ID service with the stored data in the system, preferably, comprising a person purchasing tickets for the person's friends, registered on the system, and the system is transmitting the unique customer/event numbers to the friends, after the person successfully has paid for both the person's ticket and for the person's friends' tickets, whereafter the person and the person's friends can generate their personal electronic access permissions.

BRIEF DESCRIPTION OF THE DRAWINGS

FIG. 1 shows the communication between the mobile communication device and the system when the customer is registering on the system, purchasing an electronic access and generating an electronic access permission according to one example of the invention.

FIG. 2 is a schematic sketch over a generation of the electronic access permission according used in step 11 in FIG. 1. A unique ID Number (FIG. 1, 11) and a unique customer/event number (FIG. A1 12) are used as input into the algorithm.

FIG. 3 shows a scanning process according to one example of the invention

FIG. 4 shows an example of an environment, on which the invention can be implemented, comprising a system, an electronic ID service, a mobile communication device, a scanning device, internet and/or a wireless communication networks and a customer.

DETAILED SOLUTION DESCRIPTION

The Environment

Figure 4:
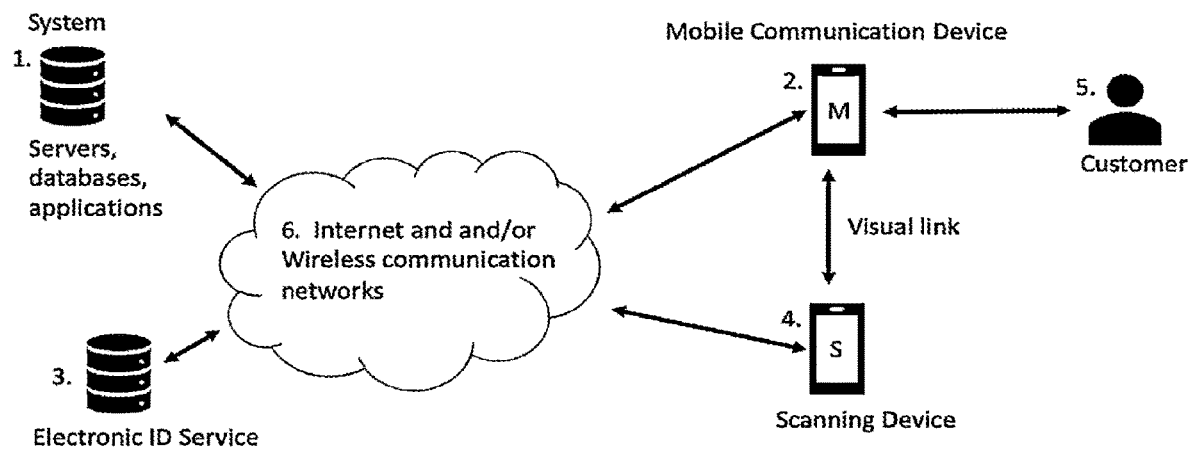
FIG. 4

A system comprises of server(s), database(s) and application(s) (FIG. 4, 1). The system is connected to an electronic ID Service (FIG. 4, 3) through internet and wireless communication networks (FIG. 4, 6). For example, BankID is an electronic ID service in Swedish. The output from an electronic ID service to the system is called customer's identity data. The system further communicates with mobile communication devices (FIG. 4, 2) and its applications (which are downloaded from, for example, apple store) through wireless communication networks and internet. A customer (FIG. 4, 5) uses the mobile communication device. In the scanning process a scanning device (FIG. 4, 4) can communicate with the system as well as the mobile communication device through a visual link (camera or video), through internet or through a wireless communication link/network Connecting the Individual to the Electronic Access Permission A personal electronic access permission needs to be associated to a customer's identity. One preferred option to authorize the identity of a customer is to use authentication credentials together with an electronic ID service that is accepted for identification by government authorities (for example BankID is an electronic ID service in Sweden). As there can only be one customer per electronic ID this is a much better authentication method compared to, for example, email with a password or SIM card or a mobile device, where the owner can be anonymous. One customer can also have several email addresses, apple IDs, phone numbers, SIM-cards, credit cards etc. which makes it difficult to control how many electronic access permissions one customer can purchase. The use of an electronic ID service will hereby reduce the risk of bots, as well as real persons, buying more electronic access permissions than policies allow, compared to for example using email addresses with password as an identifier of the customer's identity.

Figure 1:
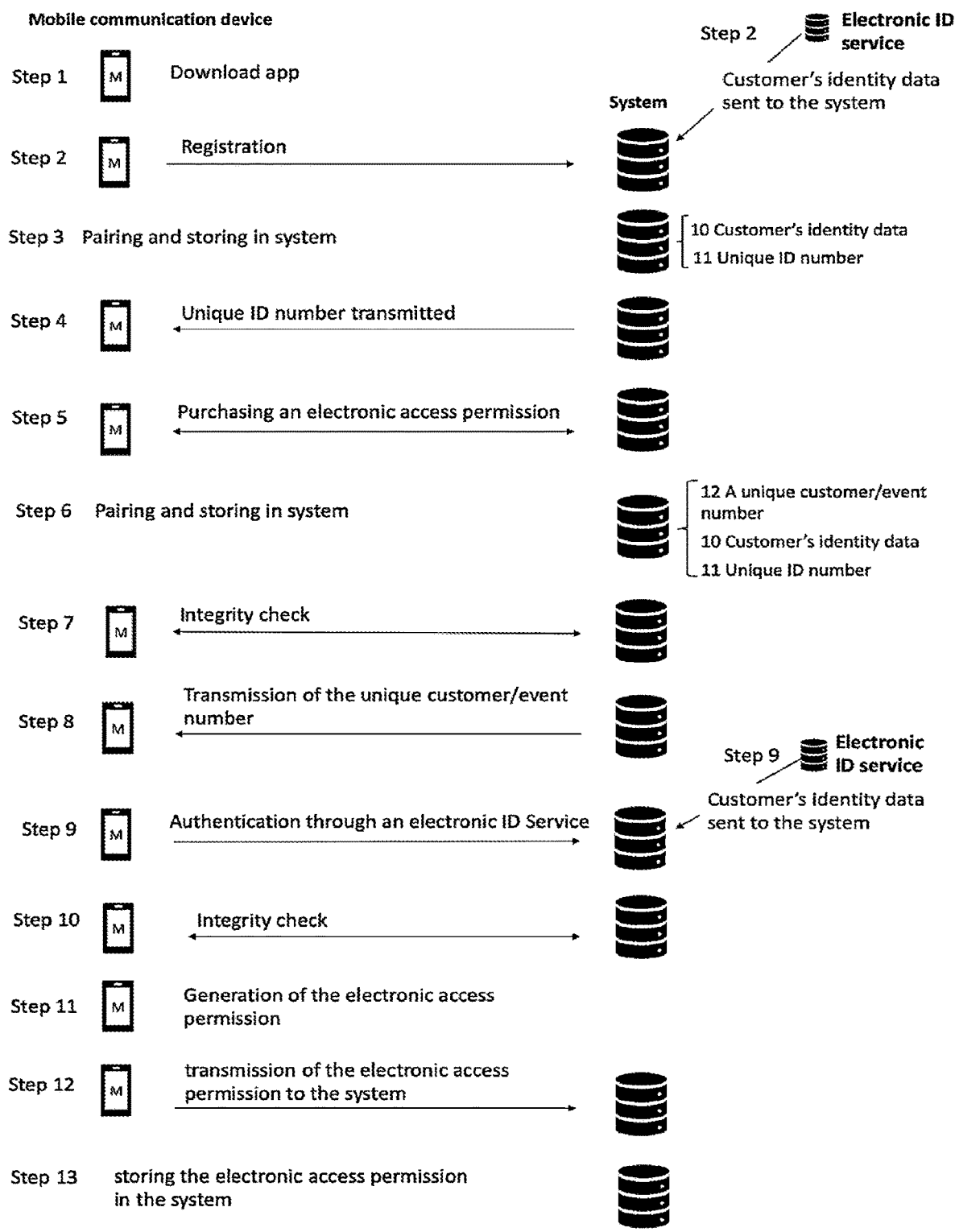
FIG. 1

After downloading an application to the mobile communication device (FIG. 1, step 1) and when a customer's identity has been validated by an electric ID service the customer can register (FIG. 1, step 2), using the customer's identity data (FIG. 1, 10) sent to the system from the electric ID service whereby a unique ID number (FIG. 1, 11) is associated and paired with the customer's identity data (FIG. 1, step 3). The unique ID number (FIG. 1, 11) is then stored in the system, whereafter the unique ID number (FIG. 1, 11) is transmitted to, and stored in, the mobile communication device (FIG. 1, step 4). The unique ID number (FIG. 1, 11) is transmitted on an encrypted link between the system and the mobile communication device.

When the customer has purchased an electronic access permission through an interaction with the system (FIG. 1, step 5) a unique number per person associated with an event, called a unique customer/event number (FIG. 1, 12), is created, stored in the system and paired with the unique ID number (FIG. 1, step 6). Before the unique customer/event number (FIG. 1, 12) is transmitted the integrity of the unique ID number (FIG. 1, 11) in the mobile is checked by the system (FIG. 1, step 7). The validation is then stored in the system.

If the unique ID number (FIG. 1, 11) in the mobile communication device is the same as in the system, the unique customer/event number (FIG. 1, 12) is transmitted to the mobile communication device, where it is stored (FIG. 1, step 8). The unique customer/event number (FIG. 1, 12) is also paired with the unique customer ID (FIG. 1, 11) in the mobile communication device.

A person can purchase tickets for the person's friends, if they are registered on the system, and the system is transmitting the unique customer/event numbers to the friends, after the person successfully has paid for both the person's ticket and for the person's friends' ticket. Then the person and the person's friends can generate their personal electronic access permissions.

Figure 2:
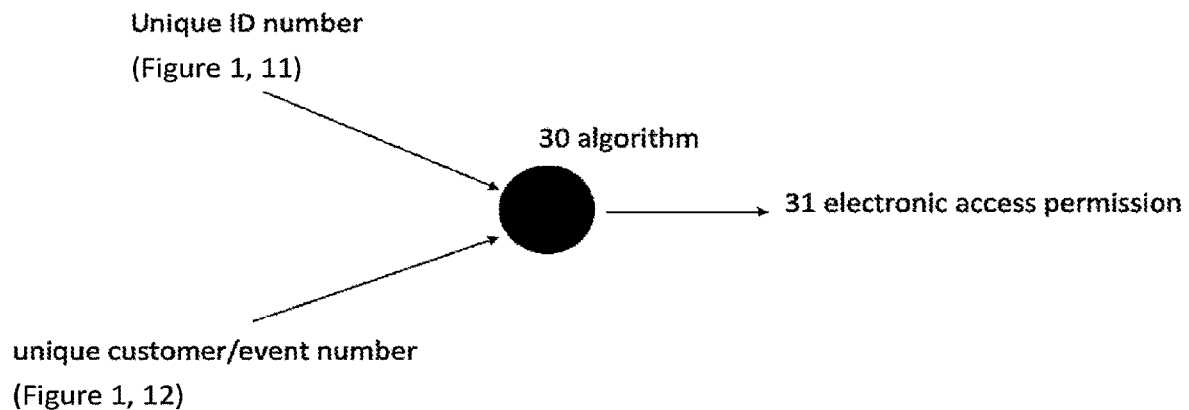
FIG. 2

Customer's consents are given before storing any personal data according to applicable regulations and laws Generation of the Digital, Personal and Secure Electronic Access Permission The downloaded application includes an algorithm that can generate an electronic access permission. With the unique ID number (FIG. 1, 11) and the unique customer/event number (FIG. 1, 12) as input to the algorithm (FIG. 2, 30), it can generate a series of, minimum two, unique numbers representing the electronic access permission (FIG. 2, 31). Another option to generate an electronic access permission is that the algorithm in the mobile communication device is generating a value which is varying, for example with time, so that the value of the electronic access permission will differ over time.

To instruct the algorithm to start the generation of the electronic access permission, at any time, the preferred solution is that the customer needs to, successfully, authenticate its identity with an electronic ID service (FIG. 1, step 9). The authentication is successful if the identity of the customer, stored in the system, is the same as the transmitted identity from the electronic ID service to the system. If the authentication is not successful, the electronic access permission is marked invalid in the system, which will be recognized in the scanning process later on. Before the generation of the electronic access permission the integrity of the data in the mobile communication device and in the system is checked upon (FIG. 1, step 10).

The electronic access permission is then generated in the mobile communication device (FIG. 1, step 11) and transmitted (FIG. 1, step 12), on an encrypted link, to the system where it is stored (FIG. 1, step 13). The algorithm is designed so that each customer has purchased a unique electronic access permission.

The electronic access permission can be stored in the mobile communication device until it is requested to be deleted, but the preferred solution, for security reasons, is that the electronic access permission is automatically deleted in the mobile communication device after a defined period of time. This requires the customer to generate a valid electronic access permission just before the scanning process at the event. The electronic access permission, in the mobile communication device, can automatically be deleted after a defined period of time, which can be in the range of 1 s to 72 h, depending on the security level the promoter chooses to set. The lower limit can be any one of 1 s, 10 s, 20 s, 30 s, 40 s, 50 s, 60 s, 2 min, 10 min, 30 min. The maximum limit can be any one of 72 h, 24 h, 2 h, 30 min, 10 min, 1 min, 30 s, 10 s. The electronic access permission can be generated upon request making sure that the holder of the mobile device is the rightful owner of the electronic access permission. Obviously, an valid electronic access permission can be generated, even if an electronic access permission previously been has deleted in the mobile communication device after a defined period of time, with a valid unique ID number (FIG. 1, 11) and a valid unique customer/event number (FIG. 1, 12), stored in the mobile communication device, as input to the algorithm (FIG. 2, 30) and be shown within the defined period of time as described above. The validation and comparison of the scanned electronic access permission and the electronic access permission stored in the system, is done in the scanning process.

Secure Scanning and a Flawless Entry Process

A scanning application is downloaded to a scanning device (FIG. 4, 4). If the electronic access permission would be represented by a static single number and, for example by a QR code, a picture could be sent to an unauthorized person, who could use the copied picture of the electronic access permission to be granted access to the event/venue.

Figure 3:
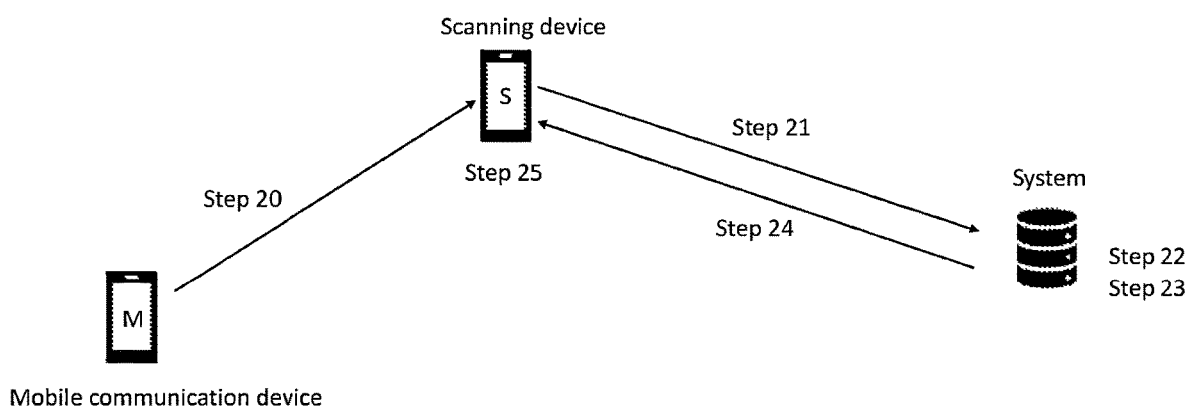
FIG. 3

In order to prevent the scenario, the present invention suggests an electronic access permission represented by a series of, minimum two, unique numbers that are transmitted in a certain order and in pre-defined time slots from the mobile communication device to the scanning device (FIG. C, Step 20). As the scanning device knows how many unique numbers that are representing the electronic access permission and the time between each unique number transmitted, the scanning device can collect all numbers representing the electronic access permission in the scanning process. After the scanning device has received the electronic access permission it will transmit it to the system (FIG. 3, Step 21). The system is then comparing the electronic access permission from the mobile communication device with electronic access permission from the system (FIG. 3, Step 22). If they are equal the customer is granted access to the event/venue. The system is also checking if the electronic access permission is marked invalid in the system, and if so, the customer is not granted access to the event/venue. Obviously, the electronic access permission stored in the system is linked to the customer through the, in the system, stored unique ID number (FIG. 3, 11) and the unique customer/event number (FIG. 1, 12). The scanning transaction is registered in the system (FIG. 3 Step 23). A message is transmitted back to the scanning device with the result of the validation of the electronic access permission (FIG. 3, Step 24). The result of the validation is displayed on the scanning device (FIG. 3, Step 25) and the scanning event is further stored in the system.

As mentioned above, one alternative to make it hard to copy an electronic access permission could be that the algorithm in the mobile communication device is generating a value which is varying, for example with time, so that the value of the electronic access permission will differ over time. In this alternative the system and the mobile communication device will need to generate matching electronic access permissions in the system and in the mobile communication device at all times. The method of the scanning process is the same as in FIG. 3 for this alternative.

As the electronic access permission can be generated in the mobile communication device upon request, the scanning process relieves, both the identity of the customer and the customer's right to access the event/venue in one scanning event and thereby save a lot of time when entering an event/venue.

If the customer don't bring the mobile communication device to the event, one option is to scan the customer's physical ID, such as for example driving license or passport, with scanning device and compare the customer's identity data stored in the system with the customer's identity data stored on the physical ID. If they match, the customer is granted access to the event/venue, after checking if the electronic access permission is valid in the system.

The individuals authorized to use the scanning device is listed on the system before usage. The authentication of an individual is done through an electronic ID service. If the electronic ID service is transmitting the same identity as being stored on the list in the system, the individual using the electronic ID service for authentication is granted access to the scanning application Preventing the Unwanted Secondary Market—No Money Transfer Outside the System The unwanted secondary market is possible if one person can sell an access permission to another known person and that the purchased access permission can be delivered to the person who purchased the access permission. As the seller and purchaser are known to each other the purchaser can compensate the seller for delivering the access permission on top of the face value.

The present invention suggests that the seller will never know the identity of the purchaser. In case the owner can't attend the event, to which he or she has purchased an electronic access permission, it is possible to sell back the electronic access permission to the system through an interaction between the customer and the system. The electronic access permission is then marked invalid in the system, which is also notified to the customer (by for example a push message). The system can hereby sell a new electronic access permission to a registered customer without involvement from the customer who sold back his electronic access permission to the system.

The electronic access permission can't be delivered directly from one person to another person as the electronic access permission is personal and integrated with a customer's identity.

Security

All numbers, and links used in the above processes are preferably encrypted. To ensure the integrity of the data before it is being used in a process, the integrity of the data is checked. The preferable option is to use a blockchain solution for integrity checks in the system as well as in the mobile communication device, as the data stored in a blockchain is immutable. With a blockchain solution, the integrity of data not stored on the blockchain can be checked with hash technology. As the data's integrity is checked upon, the data cannot be manipulated without being discovered. If the data has been manipulated the electronic access permission is marked invalid.

Counterfeits

As the electronic access permission suggested by the invention is personal it is difficult to create a credible counterfeit or copy without stealing a person's electronic ID. A valid electronic access permission can't be generated without a successful authentication of the customer's identity. Further, a valid electronic access permission can't be delivered from one mobile communication device to another mobile communication device. Thus, it is easy to recognize a valid electronic access permission and separate it from a counterfeit.

Transactions with Electronic Access Permission

As the system and the mobile communication device are connected all the transactions on the electronic access permission can be tracked, authorized and are stored on the solution. In the system it can be defined what transactions are allowed and when they are allowed to happen. Examples of transactions on an electronic access permission can be, but not limited to, marking an electronic access permission 'invalid', marking an electronic access permission as 'scanned', registering when a specific customer is transmitting the electronic access permission to the system or marking that an electronic access permission is sold.

BRIEF DESCRIPTION OF THE DRAWINGS

FIG. A shows the communication between the mobile communication device and the system when the customer is registering on the system, purchasing an electronic access and generating an electronic access permission according to one example of the invention FIG. 2 is a schematic sketch over a generation of the electronic access permission according used in step 11 in FIG. 1. A unique ID Number (FIG. 1, 11) and a unique customer/event number (FIG. 1, 12) are used as input into the algorithm FIG. 3 shows a scanning process according to one example of the invention FIG. 4 shows an example of a system, on which the invention can be implemented

The invention claimed is:

1. A method for generating a personal electronic access permission addressing reselling of tickets by non-original ticket issuers and ensuring an entrance process validating both a customer's identity and customer's permission to access an event or venue, comprising:

downloading an application to a mobile communication device;

registering, using the mobile communication device, a customer in a system including one or more servers and one or more databases and one or more applications, wherein registering includes verifying the customer's identity using an electronic ID service accepted for identification by government authorities and wherein the electronic ID service upon successful verification of the customer's identity sends customer identity data for the customer to the system;

associating the customer identity data with a unique ID number and storing the ID number and customer identity data in the system;

transmitting the ID number to the mobile communication device and storing the ID number in the mobile communication device;

purchasing, using the mobile communication device, an electronic access permission to the event or venue, wherein the purchasing comprises:
  associating a unique customer-event number with the ID number;
  storing the associated customer-event number and ID number in the system; and
  transmitting the customer-event number to the mobile communication device;

generating the electronic access permission in the mobile communication device, wherein the generating comprises:
  authenticating the identity of the customer by using the electronic ID service to ensure that the customer identity data generated by the electronic ID service is identical to the customer identity data stored in the system, wherein authentication is successful if there is a match between the customer identity data; and
  combining the ID number and the customer-event number by using an algorithm in the mobile communication device to generate the electronic access permission, wherein the electronic access permission has a time-limited validity in the mobile communication device, requiring the customer to generate the electronic access permission within a particular time period prior to a scanning event at an entrance of the event or venue;

transmitting the generated electronic access permission from the mobile communication device to the system and storing the electronic access permission in the system;

scanning the generated electronic access permission in the mobile communication device with a scanning device and transmitting the scanned electronic access permission to the system;

comparing, by the system, the scanned electronic access permission with the electronic access permission stored in the system;

checking on transactions on the electronic access permission stored in the system, including validating both the customer identity data and the customer's access permission to the event or venue in exactly one scanning event; and registering the scanning transaction on the electronic access permission in the system and transmitting the result of the validation to the scanning device to be displayed on the scanning device.

2. The method of claim 1, wherein generating the electronic access permission in the mobile communication device includes: generating a series containing at least two unique numbers, representing a starting time and an ending time, respectively, between which the electronic access permission is valid, or creating single time-varying value representing the electronic access permission.

3. The method of claim 1, wherein the time-limited validity is in the range of 1 second to 72 hours and is based on a security level set by an organizer of the event.

4. The method of claim 1, wherein generating the electronic access permission in the mobile communication device occurs in response to a request immediately prior to the scanning event.

5. The method of claim 1, further comprising:
selling back the electronic access permission to the system for a refund, following a designated refund process, through an interaction between the system and the customer, wherein the selling back includes marking the electronic access permission stored in the system as invalid and in the system and enabling issuance of a new electronic access permission.

6. The method of claim 5, further comprising:
validating the customer's right to sell back the electronic access permission to the system by:
confirming the identity of the customer by using the electronic ID service and verifying in the system that the customer is the owner of the electronic access permission by the checking customer identity data stored in the mobile communication device and in the system.

7. The method of claim 1, further comprising:
encrypting all data stored on and transmitted to or from the system and the mobile communication device, respectively.

8. The method of claim 1, further comprising:
checking the integrity of the data stored in the mobile communication device and in the system to ensure the data has not been tampered with; and
in response to detecting a loss of integrity, invalidating the electronic access permission.

9. The method of claim 1, further comprising:
invalidating the electronic access permission upon request.

10. The method of claim 1, wherein validating both the customer identity and the customer's access permission to the event in exactly one scanning event includes validating the customer's right to access the event, together with at least one of: the customer's name and the customer's age.

11. The method of claim 1, further comprising:
tracking, authorizing and storing all transactions on the electronic access permission in the system.

12. The method of claim 1, further comprising:
controlling by the system how many electronic access permissions the customer can purchase.

13. The method of claim 1, wherein scanning the generated electronic access permission comprises:
authenticating a user of the scanning device, using the electronic ID service; and
in response to successful authentication by the electronic ID service enabling the scanning device for scanning by the user.

14. The method of claim 1, further comprising:
purchasing electronic access permissions for a plurality of customers registered in the system, wherein each customer has an associated mobile communication device;
transmitting a unique customer-event number to each mobile communication device after successful payment of the purchase has been processed; and
generating in the mobile communication device of each customer included in the plurality of customers, a personal electronic access permission.

* * * * *